March 26, 1968 L. S. WIRT 3,374,856
FLEXIBLE SOUND ATTENUATING DUCT WITH FOAMED PLASTIC LINING
Filed Sept. 9, 1966 2 Sheets-Sheet 1
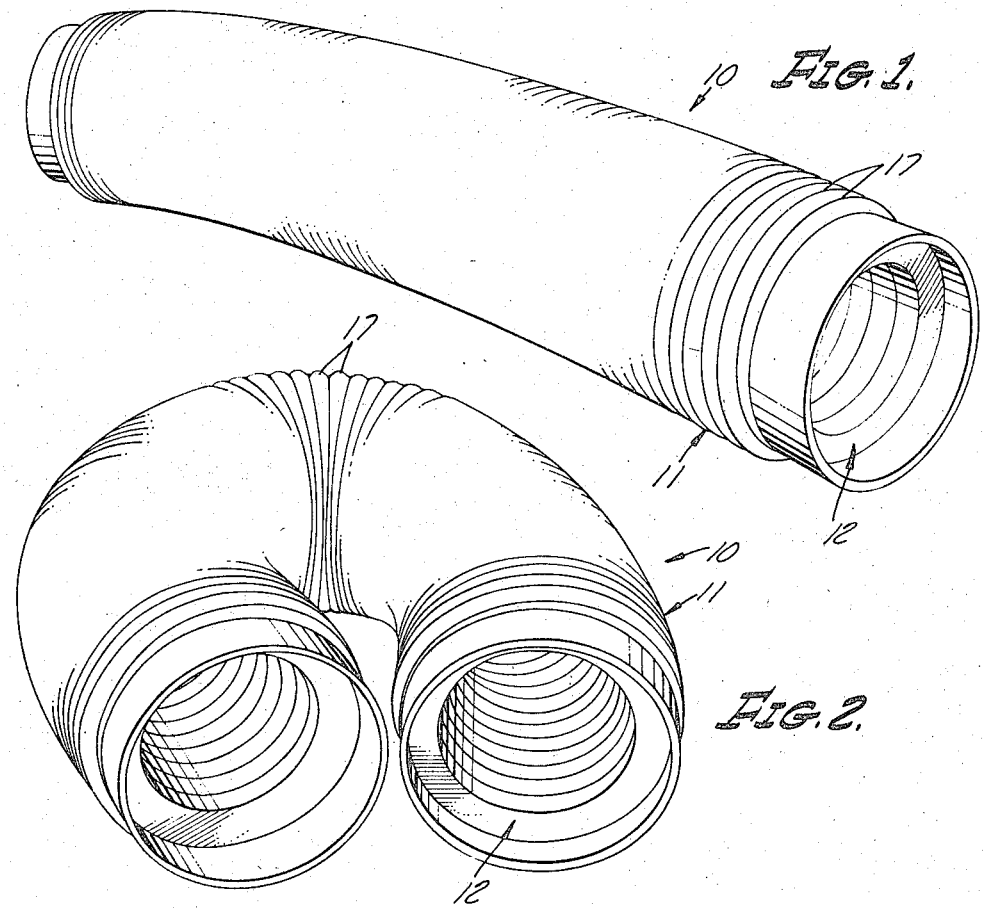
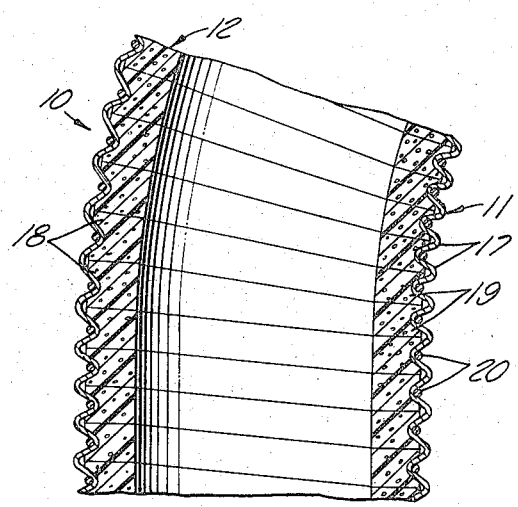
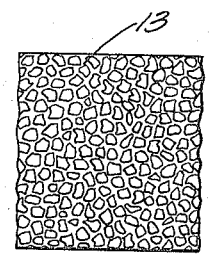
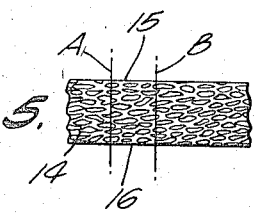
INVENTOR.
LESLIE S. WIRT
BY
Herschel C. Omohundro
ATTORNEY

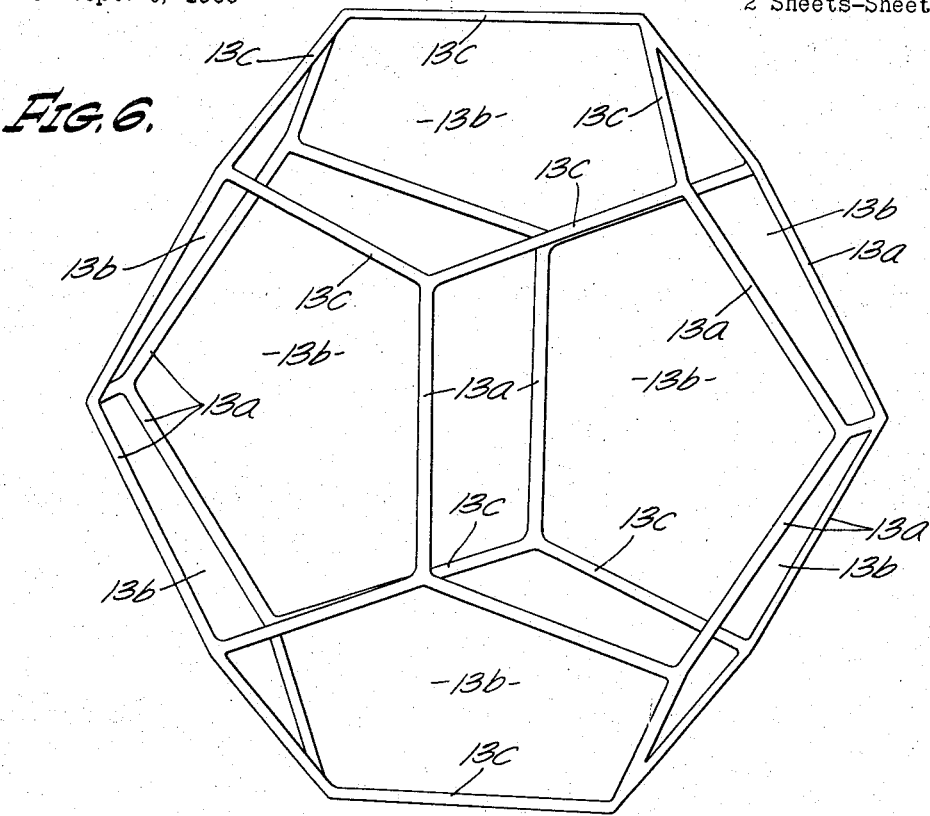
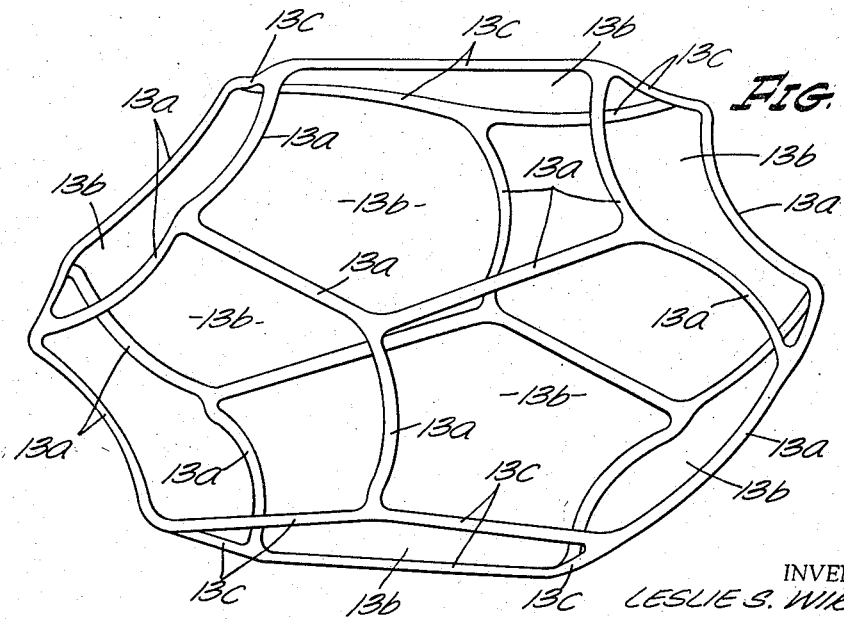

United States Patent Office 3,374,856
Patented Mar. 26, 1968

3,374,856
FLEXIBLE SOUND ATTENUATING DUCT WITH FOAMED PLASTIC LINING
Leslie S. Wirt, Phoenix, Ariz., assignor to The Garrett Corporation, Los Angeles, Calif., a corporation of California
Filed Sept. 9, 1966, Ser. No. 578,362
11 Claims. (Cl. 181—42)

This invention relates generally to the subject of acoustics and is more particularly directed to sound-attenuating materials suitable for use with rapidly flowing fluids and capable of flexing either during use or during installation without rupture and without materially changing any of the sound deadening properties.

Still more particularly, the invention relates to flexible sound-attenuating ducts suitable for use with gas turbine engines through which air or other fluids may be conducted to and from an engine without permitting excessive passage of the noise of the moving fluid or engine-operating parts through the duct wall.

An object of the invention is to provide a flexible sound-attenuating duct having a casing and a liner, the latter being formed of a material with predetermined sound-deadening qualities which is capable of being repeatedly flexed without breaking or otherwise deteriorating.

Another object of the invention is to provide a flexible sound-attenuating duct having a casing and a liner formed of a material with integrally connected fibers defining a multitude of communicating, minute air spaces, the material being compressed to buckle, fold, pleat, or otherwise shorten the effective lengths of the fibers extending in one direction and treated, such as by exposure to heat, to cause the material to remain in the compressed condition, the material being assembled in the casing so that the fibers which, in effect, have been shortened will extend axially of the finished duct whereby tension applied to the duct, such as in bending, will cause the liner material to stretch and compensate for the increased length, the release of the tension permitting the material to retract to its normal compressed dimension.

Still another object of the invention is to provide the flexible sound-attenuating duct of the preceding paragraph with a liner formed of rings or convolutions arranged and secured in face-to-face relationship, the rings or convolutions being cut from the material of the preceding paragraph in such a manner that the direction of compression will extend from face to face of the rings and thus longitudinally or axially of the duct when assembled in the casing, whereby the liner will be longitudinally extensible when subjected to tension and retractable when the tension is relieved.

A further object of the invention is to provide the sound-attenuating duct of the two preceding paragraphs with a circumferentially corrugated rubber- or plastic-impregnated fabric casing to make it more flexible and to reinforce it against collapse.

Another object is to further reinforce the duct of the preceding paragraph by disposing a helical spring with the coils thereof in the grooves of the corrugated casing.

With these and other objects, which will be apparent from the following description, the invention consists in the features of construction and combination of elements illustrated in the accompanying drawing of one form of duct.

In the drawings:
FIG. 1 is a perspective view of a portion of a flexible sound-attenuating duct formed in accordance with the present invention;
FIG. 2 is a similar view showing the duct of FIG. 1 bent or flexed into a U shape;
FIG. 3 is a fragmentary axial sectional view of the duct at a point where it is bent;
FIG. 4 is a schematic elevational view on a greatly enlarged scale of material from which the duct lining is formed, the material being shown in an early stage of manufacture; and
FIG. 5 is a similar view of the material in a later stage of manufacture;
FIG. 6 is a perspective view on a greatly enlarged scale of the connected filaments which surround one cell of the material in the stage of manufacture illustrated in FIG. 4; and
FIG. 7 is a similar view of the same filaments in the later stage of manufacture illustrated in FIG. 5.

Referring more particularly to the drawing, the duct is designated generally by the numeral 10. This duct may be of any desired size and includes an outer casing 11 and a sound-absorbing liner 12. In the form of the invention illustrated, the outer casing is composed of a rubber-or plastic-impregnated woven fabric which may be of any suitable material. If found desirable, the fabric reinforcement could be omitted without sacrificing any of the novel features of this invention. The liner 12 is preferably formed of a synthetic plastic, one suitable material being urethane rubber. A material presently available on the market and found suitable for duct construction is known by the trademark "SCOTTfelt."

It has been determined that when, during the manufacture of the material, the plastic is in a molten, foamy consistency, the bubbles are of uniform size and generally round, adjacent bubbles closely adhering to one another and forming twelve-sided cells, one of which is illustrated on a highly magnified scale in FIG. 6. As the material solidifies, thin partitions, called windows, may remain between some of the cells. The body 13 of material is then treated with an etching solution which dissolves such partitions between the cells and leaves a framework of filaments 13a and 13c, as shown in FIG. 6, which makes connected tortuous pores or passages 13b through the body. This material may have as many as 100 or more pores or passages per linear inch which, due to their minute size, give the sound-damping body a predetermined through-flow resistance. This through-flow resistance may be varied according to the specific acoustic impedance of the fluid to be carried by the duct. If air is to be conveyed, such as to the inlet of a gas turbine, the through-flow resistance of the sound-damping material should be of the same order of magnitude as the specific acoustic impedance of air. After the plastic material has been molded or otherwise formed into a sheetlike, isotropic body of predetermined thickness as illustrated in FIG. 4, it is compressed by the application of suitable forces to top and bottom surfaces 15 and 16 into a thinner anisotropic body 14 of a lesser predetermined thickness, as shown in highly magnified form in FIG. 5, and heated or otherwise treated during compression to cause the material to remain in the compressed state. FIG. 7 shows on a greatly magnified scale the filaments 13a and 13c which define one cell in the compressed state. In such state. the filaments 13a, which extended generally in the direction between the surfaces 15 and 16 to which the compressing force has been applied, will be bowed, buckled, folded, pleated, or otherwise effectively shortened. The filaments 13c in or substantially parallel to the surfaces 15 and 16 are relatively unaltered. The purpose of the shortening of the filaments 13a will be made apparent hereinafter.

In one method of forming the liner, strips are cut from the material, as indicated by the lines A–B of FIG. 5, and the strips are oriented and helically wound so that the surfaces 15 and 16 of adjacent convolutions abut one another. These surfaces, which were the ones to which the compressing forces were applied, are suitably joined, such as by cementing, so that when the liner is completed it will be a continuous tube 12. This tube is disposed in the previously formed casing 11 which is circumferentially corrugated, as at 17. Due to the joining of the abutting surfaces of the strips, tension will be applied to the surfaces 15, 16 of the strips when the duct is bent, as shown in FIGS. 2 and 3. The effective reduction in length of the fibers of the material by bowing, bending, buckling, or pleating, will permit the strips to readily stretch or elongate transversely (axially of the duct), as indicated at 18 on the left side of FIG. 3. The strips at the opposite side will be partially further compressed as at 19 in FIG. 3. When the duct is straightened, the material on the outside of the bend will retract to its normal compressed state, while the material at the inside of the bend will expand to such normal state. The characteristic of ready extension and retraction when subjected to the application and release of tension may be varied by the degree of compression of the material during the manufacture. Since the material has useful sound-damping properties prior to compression, this characteristic will be improved after compression, and even though the liner material is expanded at the outside of a bend during use, this sound-damping property will remain.

Since the material is compressed in one direction only, it is relatively stable in a direction normal to that of compression and the liner will be relatively self-supporting. The stability of the duct may be increased, however, by the addition of the casing with its circumferential corrugations and, if desired, may be further strengthened by the use of metal rings or a helically wound spring 20, the convolutions of which are disposed in the grooves of the corrugations.

It should be obvious that although the liner in the duct illustrated has been formed of a helically wound strip, it could, if desired, be formed by assembling a series of rings in face-to-face relationship. The use of the strip is clearly much more economical. It should be even more obvious that the liner could be made in a one-piece, tubular form in which case the compression forces, employed during the manufacture of the material, would be applied to the ends of the tube.

While the duct forming the invention has been shown and described in a single embodiment only, it is obvious that other liner materials may be found suitable, the primary requirements being that it have the necessary sound-absorbing or damping characteristic and the capability of expanding and contracting upon the application and relief of tension.

I claim:
1. A flexible sound-attenuating duct comprising:
   (a) a flexible tubular casing; and
   (b) a liner in said casing, said liner being composed of a sound-damping material with a through-flow resistance of the same order of magnitude as the specific acoustic impedance of the fluid to be carried by the duct, said material having the characteristic of being extensible in a direction parallel to the axis of the casing when subjected to tension and retractable upon the release of such tension.

2. A flexible sound-attenuating duct according to claim 1 in which the liner material has the characteristic of being more readily extensible in a direction axially of the duct than in any other direction.

3. A flexible sound-attenuating duct according to claim 1 in which the material of said liner consists of integrally connected fibers defining a myriad of communicating air spaces of restricted cross-sectional area, the material before insertion into the casing being subjected to compression to decrease the effective length of the fibers which will extend generally axially of the casing when the liner is disposed therein, the material also being treated to set it in the compressed state.

4. A flexible sound-attenuating duct according to claim 3 in which the liner is formed of a series of convolutions arranged in face-to-face relationship, the faces of adjacent convolutions being joined.

5. A flexible sound-attenuating duct according to claim 4 in which the material of the liner is a plastic.

6. A flexible sound-attenuating duct according to claim 4 in which the material of the liner is a urethane rubber and the adjoining surfaces of the convolutions are cemented together.

7. A flexible sound-attenuating duct according to claim 4 in which the liner convolutions are formed by helically winding a strip of material.

8. A flexible sound-attenuating duct according to claim 4 in which the liner convolutions are formed by helically winding a strip of compressed material, the strip being cut so that the direction of compression will be from face to face of the strip.

9. A flexible sound-attenuating duct according to claim 4 in which the casing is formed of impregnated fabric.

10. A flexible sound-attenuating duct according to claim 9 in which the casing is circumferentially corrugated.

11. A flexible sound-attenuating duct according to claim 10 in which a wire reinforcement is disposed in the grooves of the corrugations.

References Cited
UNITED STATES PATENTS

| | | | |
|---|---|---|---|
| 2,089,492 | 8/1937 | Lambert | 181—36 |
| 3,000,464 | 9/1961 | Watters | 181—42 XR |
| 3,175,586 | 3/1965 | Tatsch | 181—36 |

FOREIGN PATENTS

| | | |
|---|---|---|
| 579,912 | 7/1958 | Italy. |

OTHER REFERENCES

Product Engineering, periodical, issue of October 1947, pp. 138–140.

ROBERT S. WARD, Jr., *Primary Examiner.*